Dec. 16, 1924. 1,519,651

E. G. APPLETON

ELECTRICAL CONNECTING FIXTURE

Filed July 10, 1922

Inventor:
Ernst G. Appleton
by William [illegible]
Atty.

Patented Dec. 16, 1924. 1,519,651

UNITED STATES PATENT OFFICE.

ERNST G. APPLETON, OF CHICAGO, ILLINOIS, ASSIGNOR TO ROACH-APPLETON MANUFACTURING COMPANY, OF CHICAGO, ILLINOIS, A CORPORATION OF ILLINOIS.

ELECTRICAL CONNECTING FIXTURE.

Application filed July 10, 1922. Serial No. 573,996.

*To all whom it may concern:*

Be it known that I, ERNST G. APPLETON, a citizen of the United States, and a resident of Chicago, in the county of Cook and State of Illinois, have invented certain new and useful Improvements in Electrical Connecting Fixtures; and I do hereby declare that the following is a full, clear, and exact description thereof, reference being had to the accompanying drawings, and to the letters of reference marked thereon, which form a part of this specification.

This invention relates to a novel electrical connecting fixture in the nature of a connecting and supporting clip for connecting the terminals of an electrical device in circuit by means to insulate the fixture against current leakage, and refers more particularly to a terminal member, a clip member and an attaching member for binding said members together and for attaching the fixture to an insulating element, all in such manner that the connection of the terminal member and clip member and the attachment of both to an insulating strip or base may be effected by means which insure the permanent fixity of the terminal and clip members regardless of the loosening of the fastening members with respect to the insulating element, and also by the use of a minimum of materials, and cheap and simple assembling and machine operations.

The fixture may be used for a variety of purposes where desired or indicated to constitute a connection for an electrical device in a circuit. I have shown the invention as employed for use in connection with an electric fuse for the purpose of explaining and demonstrating the principles thereof, but it is to be understood that the illustrated embodiment is to be taken as illustrative and not limitative.

The invention consists in the elements and combination of elements shown in the drawings and described in the specification, and is pointed out in the appended claims.

Figure 1:
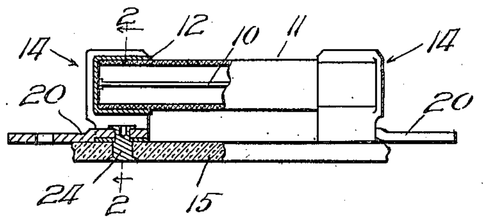
Figure 1 shows a fuse to which my invention may be applied.
Figure 2:
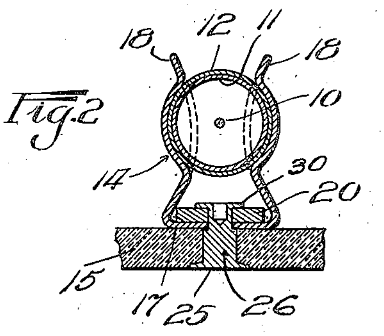
Figure 2 is a cross section on the line 2—2 of Figure 1.
Figure 3:
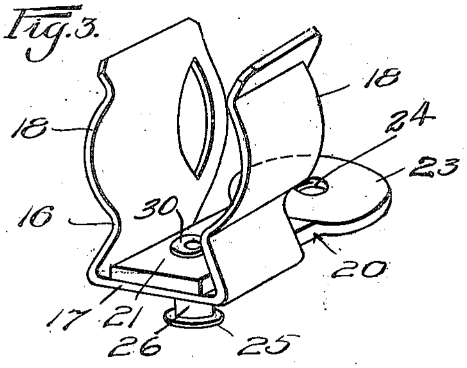
Figure 3 is a perspective view of one of the fixtures and a portion of its insulating base.
Figure 4:
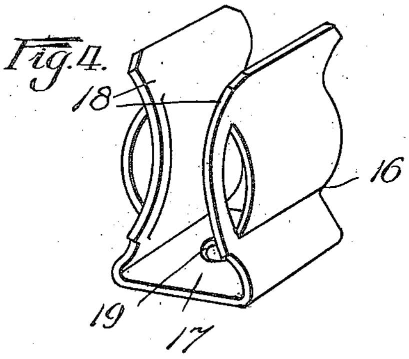
Figures 4, 5 and 6 are perspective views, respectively, of the clip member, the terminal member, and the rivet for attaching the fixture parts together and to the insulating strip or base.
Figure 5:
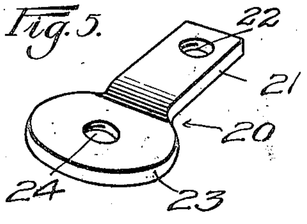
Figure 6:
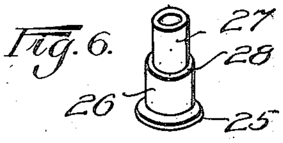

As shown in said drawings, and first referring to the general application of the invention to an electrical fuse, 10 designates the fuse element, 11 a transparent cylinder enclosing said element, and 12, 12 designate the metal ferrules of the fuse that are riveted over the ends of the shell and are electrically connected with the ends of the fuse element.

14, 14 designate as a whole the connector fixtures which receive and support the fuse by engagement with the ferrules thereof, and is, in turn, supported on an insulating base, such as the strip 15. In accordance with my invention the said fixtures are fixed to said insulating base by the same means that attach the individual parts of the fixtures together, and the construction of the fastening means is such that loosening of the fastening means in the insulating element, due to shrinkage thereof, as under temperatures generated by the current, will not loosen the fastening means relative to the individual elements of the fixture, but will maintain the said elements fixed securely together, and thereby maintain a good path for electric current through the fixture.

Referring now to the elements of the said fixture and to the means for fastening them together and for fastening the fixture to the insulating strip or base, said parts are made as follows:

16 designates a clip member which is shown as made of a single piece of sheet metal. It embraces a base portion 17 and clip arms 18, which latter are formed to closely engage the metallic parts which they are adapted to grasp, being curved in the present instance to embrace the cylindrical ferrules 12. The said base member is provided with an opening 19.

20 designates a terminal bar formed with a shank portion 21 adapted to be inserted between the arms of the clip member and below the central portion thereof. Said terminal bar is formed with an opening 22 which is adapted, when the clip member and the bar are assembled, to register with the opening 19. The outer end of the terminal bar is enlarged to form a head 23 which is provided with an opening 24 to receive a circuit wire or other conductor.

26 designates a rivet which is provided at one end with a head 25. The shank of the rivet is made of different diameters at 26 and 27, to form between the said portions of different diameters an annular shoulder 28. The reduced portion of the rivet is at the end thereof remote from the head 25, and said reduced end is shown as made hollow in the manner of a tubular rivet or eyelet to facilitate the upsetting of the rivet end to fasten the elements of the fixture together.

In assembling the parts thus described, a hole is punched in the insulating strip 15 and the rivet 26 is inserted through said hole and upwardly beyond the top face of the said strip. Thereafter the terminal bar is assembled in the clip with the openings 19 and 22 in register. The two parts thus assembled are then laid on the insulating strip 15 with the reduced end of the rivet extending through the registered openings 19 and 22. The length of the reduced end of the rivet is such, relatively to the thickness of the base portion of the clip and the terminal bar that the shoulder 28 of the rivet engages the under face of the base portion of the clip while the free end of the rivet extends a distance above the upper face of the terminal bar. Thereafter the extended reduced end of the rivet is upset over the upper face of the terminal bar by the action of an upsetting die and a punch, acting against the rivet in the directions of its axis or in other suitable manner. The upsetting operation of the free end of the rivet forms said rivet over the upper face of the terminal bar to produce a mushroom terminal 30 that is spread over said terminal bar in a manner to fixedly lock the clip base and terminal bar together in metal to metal contact, and to fix the combined structure to the insulating strip 15. The head 25 of the rivet is shaped to become embedded or countersunk in the under face of the said insulating strip 15 so that no metal projecting parts will project from the under side of the said strip.

The parts thus riveted together effects a firm fastening of the fixture as a whole to the insulating strip, and also rigidly confines the clip base and terminal bar between the shoulder 28 and mushroom terminal 30 with a metal to metal contact. It will thus be seen that should the insulating strip 15 become shrunk and reduced in thickness, due to the drying of its fibre under heat, such consequent looseness of the rivet in the strip will not affect the fastening of the fixture elements together, inasmuch as said parts are securely bound between metallic, permanently spaced shoulders on the rivet. When the clip and terminal bar are assembled the engaging surfaces thereof will be in close contact to form a good conducting path for electric current through the multipart fixture, and this path will be maintained by reason of the fastening pressure developed by the shouldered upset rivet.

It will be understood that changes may be made in the construction described within the spirit of the invention. For instance, it may not, in all uses, be necessary to use a tubular ended rivet. The tubular structure is preferable, however, by reason of the ease of upsetting it to produce a symmetrical head or holding terminal. Again, in some uses the terminal bar may be applied under the clip base instead thereabove, as herein shown.

I claim:

1. An electrical connecting fixture comprising a terminal member, a clip member, and a single device adapted for fastening the fixture to an insulating base and having permanently spaced, unitarily integral shoulders for permanently binding the said members together.

2. An electrical connecting fixture comprising a terminal member, a clip member, and means for fastening said fixture on an insulating base, formed with means to permanently and fixedly bind the terminal and clip members together, independently of the attachment of the fixture to said insulating base.

3. An electrical connecting fixture comprising a terminal member and a clip member provided with registering openings, and a headed attaching rivet formed between its ends with an integral shoulder, between which and the upset end of the rivet said members are fixedly bound together.

4. An electrical connecting fixture comprising a terminal member and a clip member provided with registering openings, and a headed attaching rivet formed between its ends with a shoulder, with its smaller end extending through said openings and with its terminal upset over one of said members.

5. An electrical connecting fixture comprising a terminal member, a clip comprising clamping arms and a connecting base, said member and base being fitted one over the other and provided with registering openings, and a single clamping and attaching device to attach the fixture to an insulating element and having permanently spaced, unitarily integral shoulders to permanently bond the fixture parts together.

6. An electrical connecting fixture comprising a terminal member, a clip comprising clamping arms and a connecting base, said member and base being fitted one over the other and provided with registering openings, and an attaching rivet projecting through said openings and upset at one of its ends over one of said parts and formed between its ends with a shoulder which comprises with the upset end of the rivet means to lock said terminal member and base permanently in metal to metal contact.

7. An electrical connecting fixture comprising a terminal member and a clip member applied one over the other and provided with registering openings, and an attaching rivet formed between its ends with a shoulder, with its consequent smaller end projecting through said openings, and tubular at its free smaller end to be upset over one of said parts.

8. The combination with an insulating base, and a fixture attached thereto, said fixture comprising a terminal member and a clip member, overlying one on the other and having registering openings, and a single headed rivet for attaching the fixture to said base adapted to extend through said base and through said registering openings, and shouldered between its ends to cooperate with its free upset end to fixedly bind the terminal and clip members in permanent metal to metal contact.

In witness whereof I claim the foregoing as my invention, I hereunto append my signature this 24 day of June, 1922.

ERNST G. APPLETON.